US012608489B2

(12) United States Patent
Xu et al.

(10) Patent No.: US 12,608,489 B2
(45) Date of Patent: Apr. 21, 2026

(54) DATA STORAGE METHOD AND APPARATUS, DEVICE, AND READABLE MEDIUM

(71) Applicant: Huawei Technologies Co., Ltd., Shenzhen (CN)

(72) Inventors: Han Xu, Chengdu (CN); Tao Huang, Shenzhen (CN); Di Chen, Hangzhou (CN); Jiawei Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 18/596,154

(22) Filed: Mar. 5, 2024

(65) Prior Publication Data

US 2024/0211612 A1    Jun. 27, 2024

Related U.S. Application Data

(63) Continuation of application No. PCT/CN2022/118404, filed on Sep. 13, 2022.

(30) Foreign Application Priority Data

Sep. 17, 2021    (CN) .......................... 202111092612.4

(51) Int. Cl.
*G06F 21/60*        (2013.01)
(52) U.S. Cl.
CPC .................................. *G06F 21/602* (2013.01)

(58) Field of Classification Search
CPC .............................. G06F 21/602; G06F 21/78
See application file for complete search history.

(56) References Cited

U.S. PATENT DOCUMENTS

| | | | |
|---|---|---|---|
| 10,496,315 B1 * | 12/2019 | Niu ........................ | G06F 3/0685 |
| 11,803,650 B1 * | 10/2023 | Hocanin ................ | G06F 16/221 |
| 2003/0231767 A1 | 12/2003 | Carbajal | |
| 2007/0079381 A1 | 4/2007 | Hartung et al. | |
| 2018/0276349 A1 | 9/2018 | Mine et al. | |
| 2020/0348954 A1 * | 11/2020 | Banerjee ............. | G06F 9/45545 |
| 2022/0277088 A1 * | 9/2022 | Kim ........................ | G06F 21/54 |

FOREIGN PATENT DOCUMENTS

| | | |
|---|---|---|
| CN | 106658034 A | 5/2017 |
| CN | 110022558 A | 7/2019 |

OTHER PUBLICATIONS

Gibson Dan, "TechChannel Hot, Warm and Cold Data Find a Home With Storage Groups", Sep. 30, 2012 (Sep. 30, 2012), XP055841113, total 6 pages.
Kim, Taehoon, et al. "Shieldstore: Shielded in-memory key-value storage with sgx". Proceedings of the Fourteenth EuroSys Conference 2019. Mar. 25, 2019, total 15 pages.

* cited by examiner

*Primary Examiner* — Sangseok Park
(74) *Attorney, Agent, or Firm* — Conley Rose, P.C.

(57) ABSTRACT
A data storage method includes receiving to-be-stored first data; encrypting a first data part in the to-be-stored first data; writing an encrypted first data part into a non-volatile memory; and then writing a second data part into a hard disk or a magnetic disk.

20 Claims, 5 Drawing Sheets

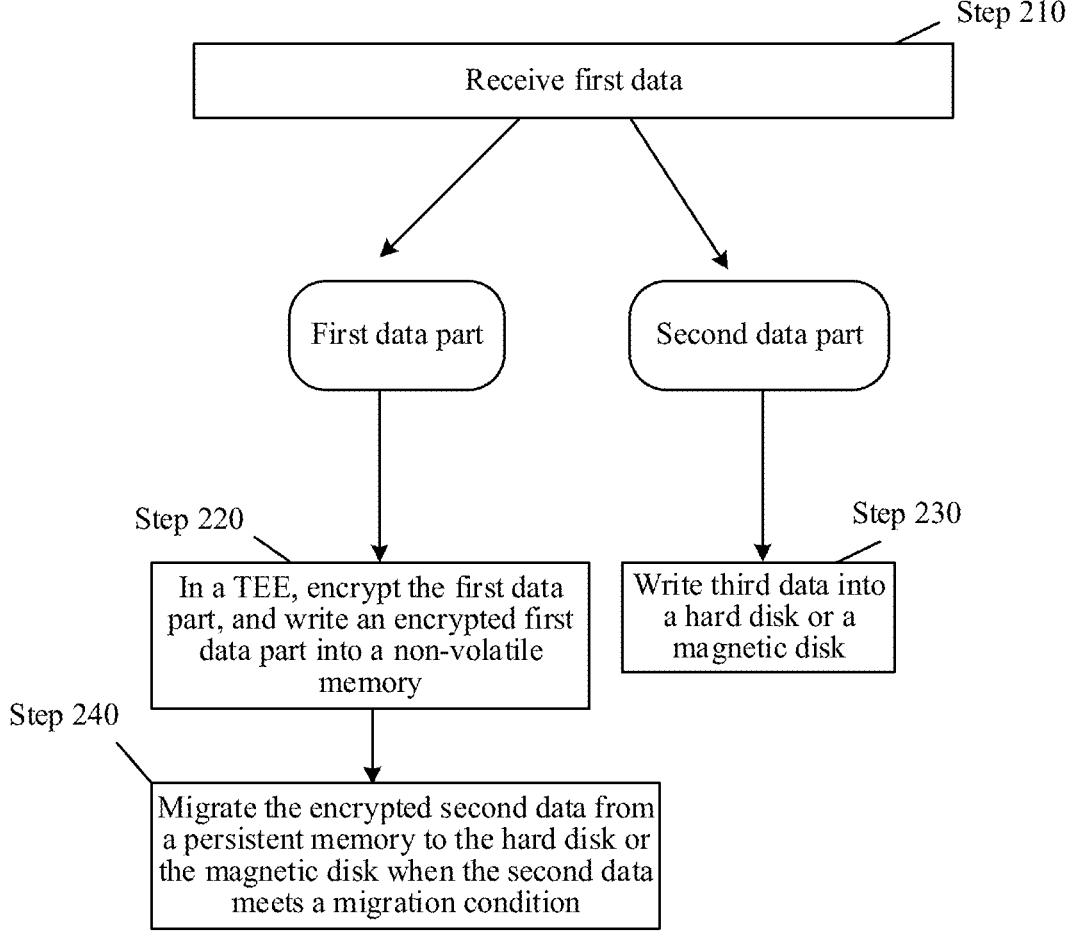

Step 210

Receive first data

First data part          Second data part

Step 220

In a TEE, encrypt the first data part, and write an encrypted first data part into a non-volatile memory Step 230

Write third data into a hard disk or a magnetic disk

Step 240

Migrate the encrypted second data from a persistent memory to the hard disk or the magnetic disk when the second data meets a migration condition

FIG. 3

DATA STORAGE METHOD AND APPARATUS, DEVICE, AND READABLE MEDIUM

CROSS-REFERENCE TO RELATED APPLICATIONS

This application is a continuation of International Patent Application No. PCT/CN2022/118404 filed on Sep. 13, 2022, which claims priority to Chinese Patent Application No. 202111092612.4 filed on Sep. 17, 2021. Both of the aforementioned applications are hereby incorporated by reference in their entireties.

TECHNICAL FIELD

The present disclosure relates to the field of storage technologies, and in particular, to a data storage method and apparatus, a device, and a readable medium.

BACKGROUND

With the development of technologies such as artificial intelligence, virtual reality (VR), and fifth-generation (5G), an amount of application data increases explosively, and a demand for migration of data to a cloud is increasing. How to ensure data security after migration to the cloud is one of the top concerns of users. In a storage field, a large amount of data is generated in various service scenarios. To control storage costs, a storage vendor deduplicates and compresses cold data that is not frequently accessed, and then stores the cold data. However, an amount of the data after deduplication and compression is still huge. Time overheads of encryption and decryption on such data are also large. This reduces read/write efficiency of the data. In addition, in this process, there is a security risk in key storage and this process is not applicable to massive data protection. It can be learned that how to implement secure and high-speed storage of massive data is an urgent problem to be resolved.

SUMMARY

According to a first aspect, an embodiment of the present disclosure provides a data storage method. The method includes: first receiving to-be-stored first data; and then encrypting a first data part in the to-be-stored first data, writing an encrypted first data part into a non-volatile memory, and then writing a second data part in the to-be-stored first data into a hard disk or a magnetic disk. Compared with encrypting entire data, the method in which a part of data is selected for encryption can greatly shorten encryption duration, and can also ensure security to some extent.

According to the method, reliable encryption is implemented on the part of data, and when only a non-encrypted part of the data is obtained, the first data cannot be obtained completely. In addition, because encrypting data of a small amount consumes short time and the encrypted data is stored in a non-volatile memory, the data can be quickly read, and an encryption and decryption operation on the data is not perceived by a user basically.

In a possible design, encrypting the first data part specifically includes: encrypting the first data part in the first data in a trusted execution environment (TEE). Encryption is performed in a secure execution environment of hardware isolation that is implemented by a TEE technology, so that reliability and security in a data encryption process can be ensured.

In a possible design, metadata of the first data part and metadata of the second data part are written into the non-volatile memory. The metadata of the first data part includes duration required for encrypting and decrypting the first data part and a quantity of times of accessing the first data part. In the method, metadata is written into a non-volatile memory, so that metadata reading efficiency can be improved.

In a possible design, the first data part is migrated from the non-volatile memory to the hard disk or the magnetic disk when the second data meets a migration condition.

In a possible design, the preset condition includes: Time required for encrypting and decrypting the first data part exceeds a threshold, and/or a frequency of accessing the first data part is less than a threshold.

In a possible design, a read request is received, and the read request is for reading the first data. The encrypted first data part is read from the non-volatile memory, and the second data part is read from the hard disk or the magnetic disk. The encrypted first data part is decrypted to obtain the first data part. The first data is obtained based on the decrypted first data part and the second data part.

According to a second aspect, an embodiment of the present disclosure further provides a data storage apparatus. The apparatus includes a receiving module configured to receive first data, where the first data is to-be-stored data; an encryption and decryption module configured to encrypt a first data part in the first data; a writing module configured to: write an encrypted first data part into a non-volatile memory, and write a second data part in the first data into a hard disk or a magnetic disk.

In a possible design, the encryption and decryption module is further configured to encrypt the first data part in the first data in a TEE.

In a possible design, the apparatus further includes a metadata management module configured to write metadata of the first data part and metadata of the second data part into the non-volatile memory. The metadata of the first data part includes duration required for encrypting and decrypting the first data part and a quantity of times of accessing the first data part.

In a possible design, the apparatus further includes a migration module configured to migrate the first data part from the non-volatile memory to the hard disk or the magnetic disk when the first data part meets a migration condition.

In a possible design, the preset condition includes: Time required for encrypting and decrypting the first data part exceeds a threshold, and/or a frequency of accessing the first data part is less than a threshold.

In a possible design, the receiving module is further configured to receive a read request, and the read request is for reading the first data. A reading module is configured to: read the encrypted first data part from the non-volatile memory, and read the second data part from the hard disk or the magnetic disk. The encryption and decryption module is configured to decrypt the encrypted first data part to obtain the first data part. The reading module is further configured to obtain the first data based on the first data part and the second data part.

According to a third aspect, an embodiment of the present disclosure further provides a computing device. The computing device includes a processor and a memory.

The memory is configured to store computer program instructions. The processor invokes the computer program instructions in the memory to perform the method according to any one of the first aspect or the possible designs of the first aspect.

According to a fourth aspect, an embodiment of the present disclosure further provides a computer-readable storage medium. When the computer-readable storage medium is executed by a computing device, the computing device performs the method according to any one of the first aspect or the possible designs of the first aspect.

According to a fifth aspect, an embodiment of the present disclosure further provides a computer program product including instructions. When the computer program product runs on a computer, the computer is enabled to perform the method according to any one of the first aspect or the possible implementations of the first aspect of the present disclosure.

BRIEF DESCRIPTION OF DRAWINGS

FIG. 3 is a schematic flowchart of a data storage method according to an embodiment of the present disclosure;

DESCRIPTION OF EMBODIMENTS

Figure 1:
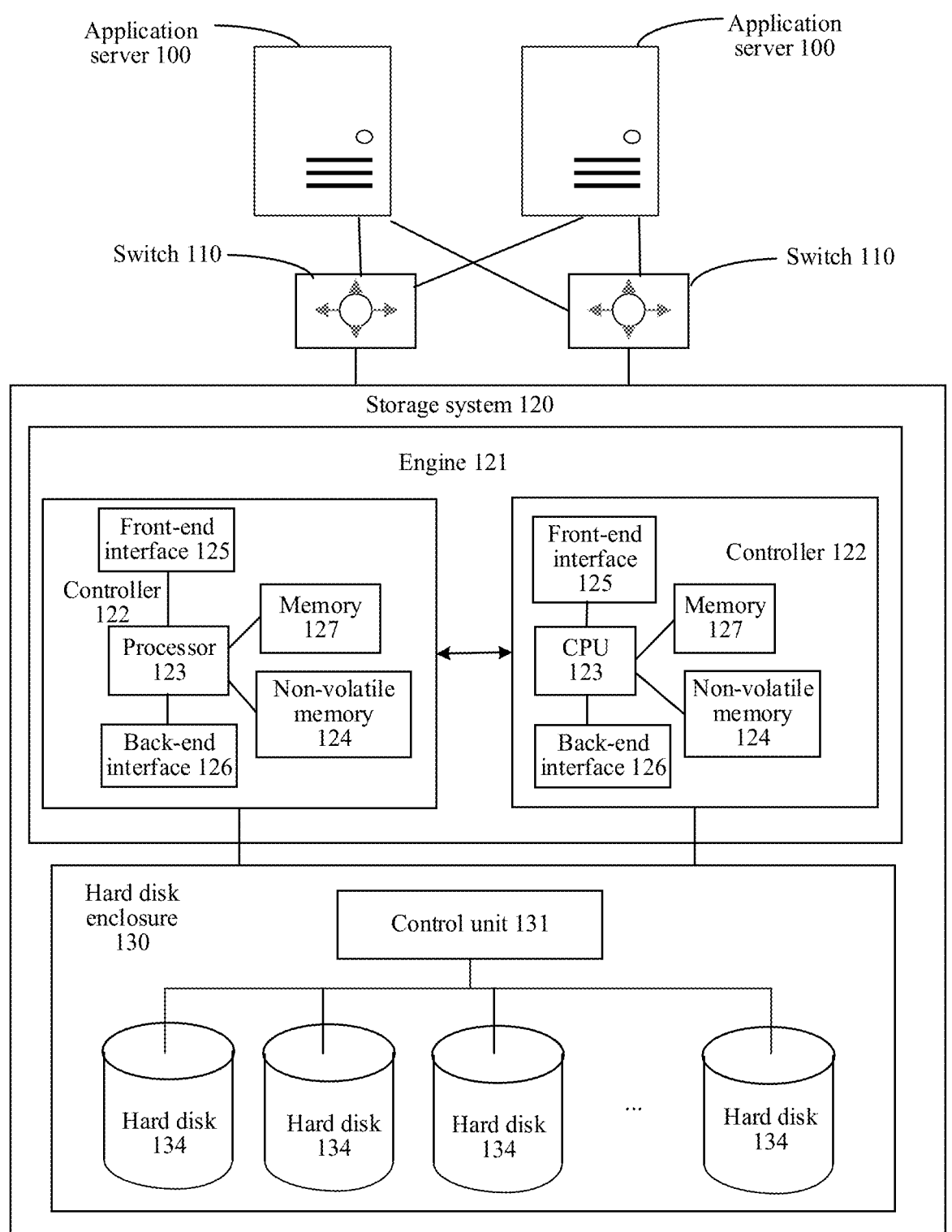
FIG. 1 is an example diagram of an architecture of a centralized storage network according to an embodiment of the present disclosure.

For ease of understanding embodiments of the present disclosure, some terms in the present disclosure are first explained and described.

(1) TEE: A secure execution environment is implemented by hardware isolation on an external resource and an internal resource. Specific implementations of the isolation include interrupt isolation, random-access memory (RAM) isolation, peripheral isolation, and isolation between a RAM and a read-only memory (ROM) in a chip. One physical central processing unit (CPU) core is divided into a secure state and a non-secure state by this isolation. When the physical core is in the non-secure state, only a non-secure peripheral and a non-secure memory can be accessed. When the physical core is in the secure state, both a secure resource and a non-secure resource can be accessed. Specifically, data is decrypted and calculated only in an isolated security zone "enclave" (Enclave). Except this, data plaintext content cannot be accessed by any other method. The data is automatically encrypted before leaving the "enclave". Various CPU vendors have launched their TEE solutions, such as ARM® TrustZone®, Intel® SGX, and AMD® SEV, to create a secure execution environment.

(2) Encryption algorithm: Two types of encryption algorithms are used in network security communication. Encryption is usually classified into symmetric key encryption and asymmetric key encryption. A symmetric cryptographic algorithm is also referred to as a single key algorithm, and an asymmetric cryptographic algorithm is also referred to as a public key cryptographic algorithm or a dual key algorithm. Common symmetric key encryption algorithms include a Data Encryption Standard (DES), a Triple Data Encryption Standard (3DES), an Advanced Encryption Standard (AES), a Triple Data Encryption Algorithm (3DEA), and the like. Common asymmetric key encryption algorithms include Rivest-Shamir-Adleman (RSA), elliptic-curve cryptography (ECC), a Digital Signature Algorithm (DSA), and the like. An encryption key of the symmetric cryptographic algorithm can be deduced from a decryption key, and vice versa. In most symmetric algorithms, encryption and decryption keys are the same. A sender and a receiver are required to negotiate a key before secure communication. Security of a symmetric algorithm depends on a key. When the key is leaked, anyone can encrypt and decrypt a message. As long as communication needs to be kept confidential, the key needs to be kept confidential.

In a storage field, a large amount of data is generated in various service scenarios. To control storage costs, a storage vendor deduplicates and compresses cold data that is not frequently accessed, and then stores the cold data. To ensure data security, the storage vendor uses the encryption algorithm to encrypt and then store the data. However, time overheads of encryption and decryption on massive data are large. This greatly reduces read/write efficiency of the data. In addition, in this process, there is a security risk in key storage.

In view of the foregoing problems, embodiments of the present disclosure provide an encryption storage solution applicable to a massive data storage scenario. In this solution, features of different storage media are used to store data, so that read/write efficiency can be accelerated when a large capacity is ensured. The data is divided into an encrypted part and a non-encrypted part. The selected data part is encrypted in a TEE based on a TEE hardware protection technology, and a key is securely stored in the TEE.

Figure 6:
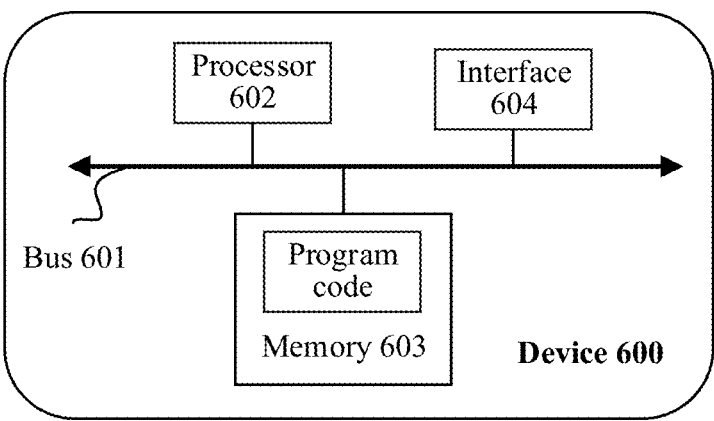
FIG. 6 is a schematic diagram of an example of a structure of a device 600 according to an embodiment of the present disclosure.

The following describes the technical solutions provided in the present disclosure from a plurality of perspectives such as a system architecture (FIG. 1 and FIG. 2), a method implementation (FIG. 3 and FIG. 4), a software apparatus (FIG. 5), and a hardware apparatus (FIG. 6). The following first describes a system architecture in embodiments of the present disclosure by using an example.

It should be noted that the system architecture and a service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that, with evolution of the system architecture and emergence of a new service scenario, the technical solutions provided in embodiments of the present disclosure are also applicable to similar technical problems.

FIG. 1 is an example diagram of an architecture of a centralized storage network according to an embodiment of the present disclosure. The storage network architecture includes an application server 100, a switch 110, and a storage system 120 (or a storage node). The method provided in the present disclosure may be applied to the storage network architecture shown in FIG. 1.

The application server 100 may be a physical machine or a virtual machine. The physical machine includes but is not limited to a desktop computer, a server, a notebook computer, and a mobile device. In an application scenario shown in FIG. 1, a user accesses data by using an application run on the application server 100.

The switch 110 is an optional device, and the application server 100 may access the storage system 120 through the fiber channel switch 110 to access the data. The application server 100 may alternatively directly communicate with the storage system 120 through a network. In addition, the fiber channel switch 110 may alternatively be replaced with an Ethernet switch, an InfiniBand® switch, a remote direct memory access (RDMA) over Converged Ethernet (RoCE) switch, or the like.

The storage system 120 includes an engine 121 and one or more hard disks 134. The engine 121 is the most core component in the centralized storage system, and many advanced functions of the storage system are implemented in the engine 121.

The storage system 120 shown in FIG. 1 is a storage system in which a disk and a controller are separated. In other words, the engine 121 and the hard disk 134 are deployed on two devices. The system 120 in FIG. 1 further includes a hard disk enclosure 130, and the hard disk enclosure 130 includes a control unit 131, several hard disks 134, and a network interface card (not shown in the figure).

The engine 121 includes one or more controllers. Two controllers 122 in FIG. 1 are used as an example. A mirror channel exists between the two controllers, so that the two controllers 122 can back up each other, thereby avoiding unavailability of the entire storage system 120 caused by a hardware fault. The engine 121 further includes a front-end interface 125 and a back-end interface 126. The front-end interface 125 is configured to communicate with the application server 100, to provide a storage service for the application server 100. The back-end interface 126 is configured to communicate with the hard disk 134, to expand a capacity of the storage system.

The controller 122 includes at least a processor 123, a non-volatile memory 124, and a memory 127. The processor 123 is a CPU, and is configured to process a data access request from outside of the storage system (a server or another storage system), and is also configured to process a request generated inside the storage system.

The non-volatile memory (NVM) 124 is an internal memory that does not lose data in case of a power failure. For example, the non-volatile memory 124 may be a storage-class memory (SCM). The SCM is also referred to as a persistent memory (PMem/PM), and is a composite storage technology combining both a conventional storage apparatus feature and a memory feature. The SCM has both features of persistence and fast byte-wise access. The SCM can provide a faster read/write speed than a hard disk, but is slower than a dynamic RAM (DRAM) in terms of an access speed and cheaper than the DRAM in terms of costs. In a narrow sense, the SCM may be a byte-wise addressing NVM device that uses a memory Dual Inline Memory Module (DIMM) interface. Specifically, the SCM may include any other storage chip that has both fast byte-wise addressing and persistence features, such as a phase-change memory (PCM), a resistive random access non-volatile memory (ReRAM), a non-volatile magnetic RAM (MRAM), or a carbon nanotube RAM (NRAM).

In the scenario of this embodiment of the present disclosure, the non-volatile memory 124 may be configured to store persistent data, for example, encrypted data in a secure storage scenario. Compared with data stored in the hard disk 134, data stored in the non-volatile memory 124 may provide a higher read/write speed for a CPU.

In addition to the foregoing non-volatile memory 124, the storage system 120 may further include another type of the memory 127 configured to directly exchange data with the processor. For example, the memory 127 may be a RAM or a ROM. For example, the RAM is a DRAM, a static RAM (SRAM), or the like.

The processor 123 may run a software program in the memory to manage the hard disk. For example, the hard disk is abstracted into a storage resource pool and then divided into LUNs for a file server to use. The LUN herein is the hard disk that is viewed on the application server. Some centralized storage systems are also file servers that provide file sharing services for the application server.

The hard disk 134 is configured to provide a storage resource. Based on a type of a communication protocol between the engine 121 and the hard disk 134, the hard disk 134 may be a serial attached SCSI (SAS) hard disk, an NVM Express (NVMe) hard disk, a peripheral device high-speed connection standard Peripheral Component Interconnect Express (PCIe) hard disk, a serial advanced technology attachment (SATA) hard disk, or another type of hard disk enclosure. In this embodiment of the present disclosure, the hard disk 134 may be a hard disk drive (HDD) or a solid-state drive (SSD). Alternatively, the hard disk 134 may be replaced with a magnetic disk or another type of storage medium, for example, a shingled magnetic recording (SMR) hard disk.

The control unit 131 may have various forms. In an implementation, the hard disk enclosure 130 may be a smart disk enclosure, the hard disk 130 includes the control unit 131, and the control unit 131 includes a CPU and a memory. The CPU is configured to perform operations such as address translation and data reading and writing. The network interface card is configured to communicate with another server 110. In another implementation, a function of the control unit 131 may be offloaded to the network interface card. In other words, in this implementation, the hard disk enclosure 130 may not include the control unit 131, but the network interface card completes data reading and writing, address translation, and other computing functions. In this case, the network interface card is an intelligent network interface card.

Optionally, the storage system 120 shown in FIG. 1 may alternatively be a storage system in which a disk and a controller are integrated. The engine 121 has a hard disk slot, and the hard disk 134 may be directly deployed in the engine 121. In other words, the hard disk 134 and the engine 121 are deployed on a same device.

Figure 2:
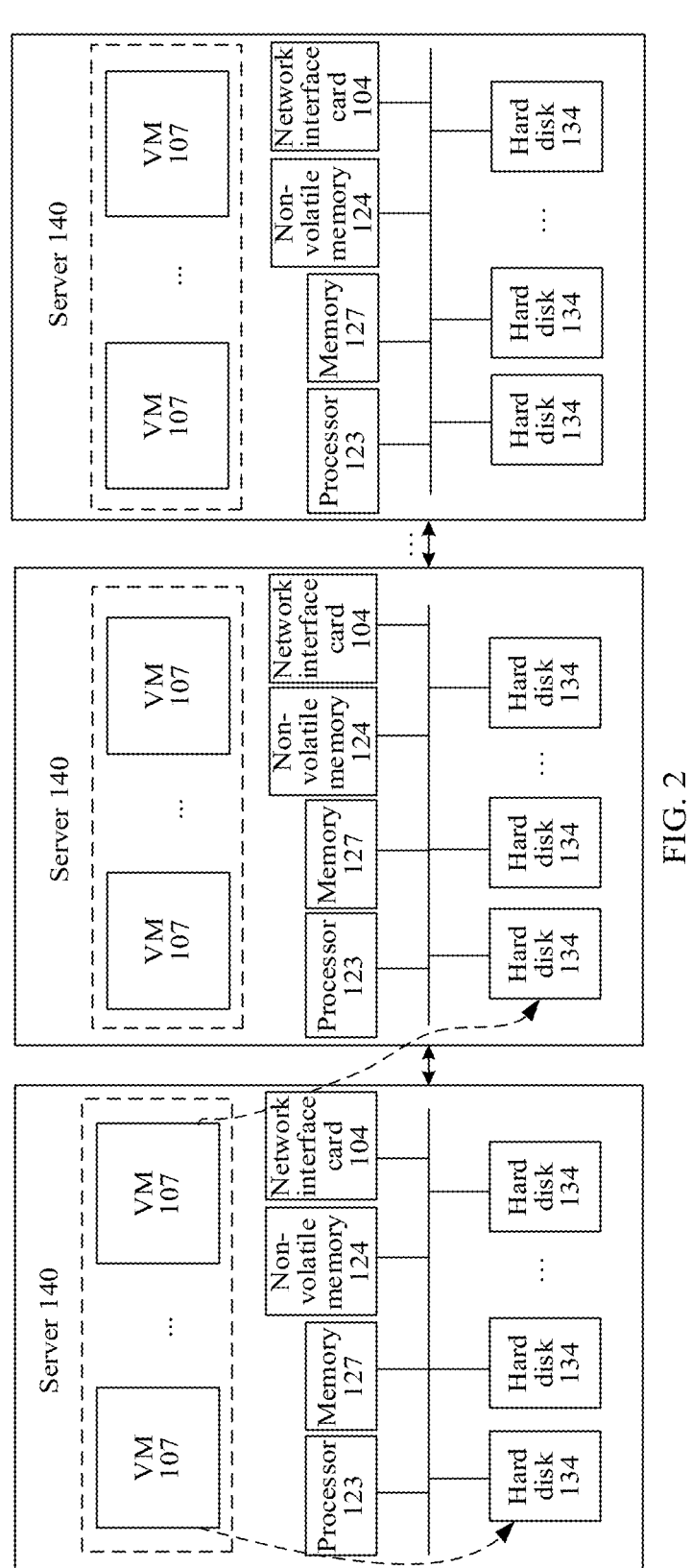
FIG. 2 is a schematic diagram of a system architecture of a distributed storage system according to an embodiment of the present disclosure.

The data storage method provided in embodiments of the present disclosure is also applicable to a distributed storage system in addition to the centralized storage system. FIG. 2 is a schematic diagram of a system architecture of a distributed storage system according to an embodiment of the present disclosure. The distributed storage system includes a server cluster. The server cluster includes one or more servers 140 (FIG. 2 shows three servers 140, but is not limited to three servers 140), and the servers 140 can communicate with each other.

A server 140 is a device that has both a computing capability and a storage capability, for example, a server or a desktop computer. In software, each server 140 has an operating system. A virtual machine 107 may be created on the server 140. A computing resource required by the virtual machine 107 comes from a local processor 123 and a local memory 127 of the server 140. A storage resource required by the virtual machine 107 may come from a local hard disk 134 of the server 140, or may come from a hard disk 134 in another server 140. In addition, various applications may be run in the virtual machine 107, and a user may trigger a request of reading/writing data by using the application in the virtual machine 107.

The server 140 may perform the data storage method according to embodiments of the present disclosure. In terms of hardware, as shown in FIG. 2, the server 140 includes at least a processor 123, a memory 124, a network interface card 104, and a hard disk 134. The processor 123, the memory 124, the network interface card 104, and the hard disk 134 are connected by a bus, and the network interface card 104 is configured to communicate with another application server 110. For functions and specific types of the processor 123, the non-volatile memory 124, the memory 127, and the hard disk 134, refer to related descriptions in FIG. 1.

It should be noted that FIG. 2 is merely an example diagram of the distributed storage system, and is an example of a fully converged architecture. In an actual distributed storage system architecture, there are other possible implementations, for example, integrating storage with computing, or separating storage from computing. This is not limited in embodiments of the present disclosure.

The following describes an implementation process of a data storage method according to an embodiment of the present disclosure. For example, the method may be applied to the storage systems in FIG. 1 and FIG. 2. FIG. 3 shows an example of a flowchart of the data storage method. An implementation process may include the following steps.

Step 210: Receive to-be-stored first data.

A processor 123 receives the first data. The first data may be data received from an application. For example, in the centralized system in FIG. 1, the controller 122 in the storage system 120 receives a write request sent from outside of the storage system (the application server 100 or another storage system). The write request carries the to-be-stored first data. Optionally, before encrypting and storing the first data, the processor may further first deduplicate and compress the first data.

Optionally, the first data is split to generate a first data part and a second data part.

In a possible implementation, a size of a data part (the first data part) that needs to be encrypted is determined from the first data based on features of different TEE mechanisms. The data is split into the first data part that needs to be encrypted and the second data part that does not need to be encrypted.

As a data amount increases, time consumed by mainstream encryption algorithms increases significantly. In addition, SGX, TrustZone®, and SEV only support data protection with a limited memory size. If the data amount exceeds this size, performance of data read/write I/O deteriorates sharply. Therefore, an amount of data of the encrypted part needs to be flexibly selected based on TEE data operation duration and encryption algorithm performance. Details are as follows:

(a) An SGX protectable area supports a maximum of 128 MB. If the data amount exceeds 128 MB, the data read/write I/O consumes more time. Time overheads are huge. Therefore, the SGX is not applicable to protection for a large data amount. Based on a current test result, when a size of a protectable area is less than 64 MB, the SGX has the minimum data read/write latency. As an example, data of 4 KB to 64 MB may be selected for encryption in the SGX, that is, in step 2, the first data is split into a first data part of a size of 4 KB to 64 MB and a remaining second data part.

(b) The TrustZone® and SEV provide a full memory protection function. Data that exceeds a memory size cannot be protected. In addition, there is no data persistence design. In other words, the first data is split based on a memory size. For example, the memory herein may be the non-volatile memory 124 in FIG. 1 or FIG. 2. It is assumed that a size of the memory 124 is 256 MB. In this step, the first data is split into a first data part of 128 MB and a remaining second data part.

Step 220: Encrypt the first data part based on a TEE technology, and write an encrypted first data part and a corresponding key into the non-volatile memory.

Figures 4, 5:
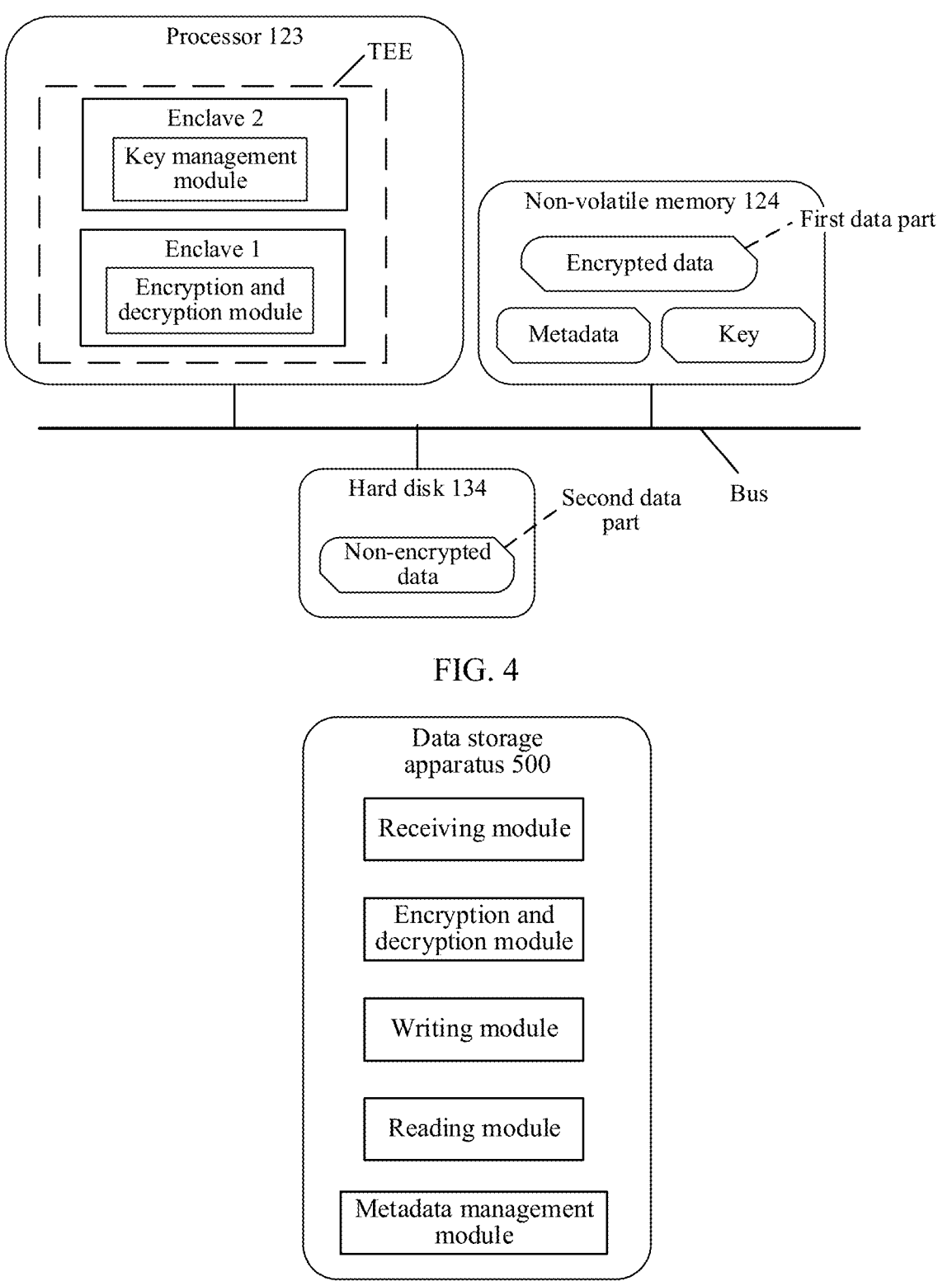
FIG. 4 is a schematic diagram of hardware according to an embodiment of the present disclosure.
FIG. 5 shows a data storage apparatus 500 according to an embodiment of the present disclosure.

FIG. 4 is a schematic diagram of hardware according to an embodiment of the present disclosure. The method in FIG. 3 is further described with reference to a hardware structure. As shown in FIG. 4, for example, a TEE in a processor 123 may include two isolated secure zones: an enclave 1 and an enclave 2. The enclave 1 is configured to perform data encryption and decryption, and the enclave 2 is configured to perform key management.

Specifically, the processor 123 transfers data (that is, the first data part) that needs to be encrypted into the TEE, and performs data encryption and decryption calculation. In a possible implementation, the processor 123 completes encrypting the first data part in the enclave 1. For example, the processor 123 may encrypt the first data part by using an encryption algorithm (for example, an AES, a 3DEA, or a DES), and store a generated key in a non-volatile memory 124. To ensure security, a current CPU card usually uses the 3DES algorithm for encryption, and a password length is 128 bits. In addition, the processor 123 further generates corresponding metadata of the first data part. A management method and a data structure of the metadata are different from those of metadata of non-encrypted data.

In a possible implementation, the processor 123 implements a key management function in another isolated secure area, that is, the enclave 2. A main function is to provide various key generation mechanisms and encryption algorithms, and store the generated key in the non-volatile memory 124. Optionally, processes of the key management and the encryption and decryption calculation may alternatively be completed in a same enclave.

In an encryption process, the processor 123 records time consumed in an entire data encryption process, and then stores the consumed time in corresponding metadata. Similarly, in a decryption process, consumed time in an entire data encryption process is recorded and then stored in corresponding metadata. Optionally, metadata also records a quantity of times of accessing the encrypted data.

In a possible implementation, metadata is stored in the non-volatile memory 124. The metadata herein may include the metadata of the encrypted data (the encrypted first data part), and may further include the metadata of the non-encrypted data (the second data part).

Optionally, because the first data part is stored in the NVM, a metadata management policy with a specific consistency policy may be used for ensuring consistency of data in the NVM and an SSD. For example, shadow paging and an optimization policy of the shadow paging ensure high-speed data reading and writing and data consistency.

Step 230: Write the second data part into a hard disk or a magnetic disk.

The processor 123 writes the second data part that does not need to be decrypted into a hard disk 134. In addition, the processor 123 further generates corresponding metadata of the second data part.

Optionally, because the second data part is stored in the hard disk 134 (for example, the SSD), a meta-management structure applicable to a block device may be used. For example, log-structured is a method for ensuring data consistency, and a sequential appending write feature of the log-structured is applicable to the block device (which can improve a read/write speed).

In a possible implementation, the encrypted data (the first data part) and the non-encrypted data (the second data part) are separately managed by establishing respective metadata management structures. "Respective" means that there are respective metadata indexes (for example, data in the NVM is indexed by a hash, and data in the SSD is indexed by a tree), and then appropriate metadata management mechanisms are established based on respective index structures.

Step 240: Migrate the encrypted first data part from the non-volatile memory to the hard disk or the magnetic disk when the first data part meets a migration condition.

In a possible implementation, if a capacity of an NVM medium reaches a limit, data migration is triggered. A part of data is identified according to a migration policy (based on time consumed for encryption and decryption on the data, a quantity of times of accessing the data, and the like), and subsequently the selected data is migrated to a lower-layer large-capacity medium. For example, the processor 123 reads the metadata of the first data part, and determines, based on time consumed for encryption and decryption and a quantity of access times, whether the encrypted data (the first data part) is migrated to the lower-layer large-capacity medium (the SSD/an HDD/the magnetic disk).

When the time required for encrypting and decrypting the first data part exceeds a threshold, and/or a frequency of accessing the first data part is less than a threshold, it is determined that the first data part needs to be migrated, to reduce occupation of an NVM resource. When it is determined that migration is required, the encrypted data is migrated from the NVM to the SSD.

In the solution provided in this embodiment of the present disclosure, the to-be-stored data is split into two parts, only a small part of the data is selected for encryption, and the encrypted data and non-encrypted data are processed in parallel. Compared with encrypting entire data, the solution can greatly reduce encryption duration. A small amount of encrypted data requires short transmission duration, and a large amount of non-encrypted data requires long transmission duration. Parallel operations can offset time consumed by an encryption and decryption operation to some extent, so that data can be quickly read and the encryption and decryption operation on the data is not perceived basically.

In addition, physical features of different storage media are considered, and a hybrid metadata management policy is designed. In other words, the encrypted data (the first data part) and the non-encrypted data (the second data part) are separately managed by establishing respective metadata management structures. In addition to satisfying high concurrency, the solution in this embodiment of the present disclosure can further adapt to different medium features, thereby maximizing data transmission performance.

According to the data storage method in FIG. 2 and FIG. 3, embodiments of the present disclosure further provide examples of corresponding data read and data deletion methods. Only brief descriptions are provided herein, and similar content is not described again.

(1) Data Read

For example, when the processor 123 receives a data read request, based on a mark carried in data, it is assumed that the mark points to the first data. The processor 123 reads the metadata of the encrypted part and the non-encrypted part that are of the first data from the NVM (that is, the 124). If neither of the two types of metadata exists, no information is returned. If one type of metadata exists but the other type of metadata does not exist, a troubleshooting process starts. If both the two types of metadata exist, the encrypted first data part is read from the NVM into the TEE, and the non-encrypted second data part is read from the SSD. The first data part is decrypted in the TEE in FIG. 2 (for example, in an enclave 1) to obtain the first data. Finally, the second data part and the decrypted first data part are combined to obtain the complete first data, and the complete first data is returned to an upper layer.

(2) Data Deletion

For example, when receiving a data deletion request, the processor 123 reads the metadata of the encrypted data part and the metadata of the non-encrypted data part from the NVM based on a mark carried in data. If neither of the two types of metadata exists, no information is returned. If one of the two types of metadata exists but the other type of metadata does not exist, a troubleshooting process starts. If both the two types of metadata exist, the encrypted data and the non-encrypted data are deleted, and the metadata of the encrypted data and the metadata of the non-encrypted data are deleted. If the deletion is successful, a success message is returned.

Based on a same concept as the method embodiments, embodiments of the present disclosure further provide a data storage apparatus.

FIG. 5 shows a data storage apparatus 500 according to the present disclosure. The apparatus may be deployed on the storage system 120 or the server 140 in FIG. 1 or FIG. 2. As shown in FIG. 5, for example, the data storage apparatus may include: a receiving module, a splitting module, an encryption and decryption module, a writing module, a metadata management module, a migration module, and a reading module.

The receiving module is configured to receive first data, where the first data is to-be-stored data. The first data may be data received from an application. For example, in the centralized system in FIG. 1, the controller 122 in the storage system 120 receives a write request sent from outside of the storage system (the application server 100 or another storage system). The write request carries the to-be-stored first data. Optionally, the receiving module is configured to receive a read request, where the read request is for reading the first data.

Optionally, the splitting module (not shown in FIG. 5) is configured to split the first data to generate a first data part and a second data part. Specifically, the first data part is encrypted in a TEE. In a possible implementation, a size of a data part (the first data part) that needs to be encrypted is determined from the first data based on features of different TEE mechanisms. The data is split into the first data part that needs to be encrypted and the second data part that does not need to be encrypted. For specific content, refer to the content and the text descriptions of FIG. 2 and FIG. 3. Details are not described herein again.

The encryption and decryption module encrypts the first data part. Specifically, the processor 123 transfers data (that is, the first data part) that needs to be encrypted into the TEE, and performs data encryption and decryption calculation. For related content, refer to the foregoing. Details are not described herein again. Optionally, when a read request is subsequently received, the encryption and decryption module may further decrypt the first data part.

The writing module is configured to write an encrypted first data part into a non-volatile memory, and write the second data part into a hard disk or a magnetic disk.

The metadata management module is configured to write metadata of the first data part and metadata of the second data part into the non-volatile memory. Optionally, the metadata of the first data part includes: duration required for encrypting and decrypting the first data part and a quantity of times of accessing the first data part. A preset condition includes: Time required for encrypting and decrypting the first data part exceeds a threshold, and/or a frequency of accessing the first data part is less than a threshold. In an encryption process, the module records time consumed in an entire data encryption process, and then stores the consumed time in corresponding metadata. Similarly, in a decryption process, consumed time in an entire data encryption process is recorded and then stored in corresponding metadata. Optionally, metadata further records a quantity of times of accessing the encrypted data. In a possible implementation, the module stores the metadata in the non-volatile memory 124. The metadata herein may include the metadata of the encrypted data (the encrypted first data part), and may further include the metadata of the non-encrypted data (the second data part). For related content, refer to the foregoing. Details are not described herein again.

The migration module (not shown in FIG. 5) is configured to migrate the encrypted first data part from the non-volatile memory to the hard disk or the magnetic disk when the first data part meets a migration condition. In a possible implementation, if a capacity of an NVM medium reaches a limit, data migration is triggered. A part of data is identified according to a migration policy (based on time consumed for encryption and decryption on the data, a quantity of times of accessing the data, and the like), and subsequently the selected data is migrated to a lower-layer large-capacity medium. For example, the processor 123 reads the metadata of the first data part, and determines, based on time consumed for encryption and decryption and a quantity of access times, whether the encrypted data (the first data part) is migrated to the lower-layer large-capacity medium (the SSD/an HDD/the magnetic disk).

The reading module is configured to respectively read the first data part and the second data part from the non-volatile memory and the hard disk or the magnetic disk based on metadata of the first data. The metadata of the first data includes the metadata of the first data part and the metadata of the second data part. Optionally, the module is further configured to: obtain the first data based on the first data part after decryption and the second data part, and return the first data.

FIG. 6 is a schematic diagram of an example of a structure of a device 600 according to an embodiment of the present disclosure. The device may be configured to implement the method provided in FIG. 3 and FIG. 4. The device 600 may be a server 140, a storage system 120, or any computing device of the storage system 120. The computing device 600 in the figure includes a bus 601, a processor 602, a memory 603, and an interface 604. The processor 602 and the memory 603 communicate with each other through the bus 601.

The bus 601 is configured to connect the processor 602, the memory 603, the interface 604, and another possible component, and may include one or more of an address bus, a data bus, a control bus, an extended bus, and a local bus. For ease of indication, the bus is indicated by using only one bold line in the figure. However, it does not indicate that there is only one bus or only one type of bus. The bus 601 uses standards such as a peripheral component interconnect (PCI) bus or an extended industry standard architecture (EISA) bus.

The processor 602 may be a CPU or another type of processor chip, and the processor 602 may perform the data storage method according to embodiments of the present disclosure. The memory 603 may include one or more of any other memory, storage device, or storage medium that can be used to store and save information, such as a RAM, a ROM, a flash memory (flash EPROM), an HDD, or an SSD. The memory 603 stores executable program code, and the executable program code may be executed by the processor 602 to implement the data storage method in FIG. 3 and FIG. 4 in embodiments of the present disclosure.

The interface 604 may be a network interface card (NIC), another type of transceiver device and host bus adapter (HBA), or the like, and is configured to communicate with another device.

All or some of the foregoing embodiments may be implemented by software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on a computer, the procedures or functions according to embodiments of the present disclosure are all or partially generated. The computer may be a general-purpose computer, a dedicated computer, a computer network, or other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, Digital Versatile Disc (DVD)), a semiconductor medium, or the like. The semiconductor medium may be an SSD.

A person skilled in the art should understand that embodiments of the present disclosure may be provided as a method, a system, or a computer program product. Therefore, the present disclosure may use a form of a hardware-only embodiment, a software-only embodiment, or an embodiment with a combination of software and hardware. In addition, the present disclosure may use a form of a computer program product that is implemented on one or more computer-usable storage media (including but not limited to a magnetic disk storage, a compact-disc (CD)-ROM (CD-ROM), an optical memory, and the like) that include computer-usable program code.

The present disclosure is described with reference to the flowcharts and/or block diagrams of the method, the device (system), and the computer program product according to the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more procedures in the flowcharts and/or in one or more blocks in the block diagrams.

These computer program instructions may alternatively be stored in a computer-readable memory that can guide the computer or another programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These computer program instructions may alternatively be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more procedures in the flowcharts and/or in one or more blocks in the block diagrams.

It is clear that a person skilled in the art can make various modifications and variations to the present disclosure without departing from the scope of the present disclosure. In this case, if the modifications and variations made to the present disclosure fall within the scope of the claims of the present disclosure and their equivalent technologies, the present disclosure intends to include these modifications and variations.

What is claimed is:

1. A method comprising:
receiving first data;
encrypting a first data part of the first data to obtain an encrypted first data part;
writing the encrypted first data part into a non-volatile memory;
writing a second data part of the first data into one of a hard disk or a magnetic disk; and
writing first metadata of the first data part and second metadata of the second data part into the non-volatile memory, wherein the first metadata comprises a duration required for encrypting and decrypting the first data part and a quantity of times of accessing the first data part.

2. The method of claim 1, wherein the first data part is smaller than the second data part.

3. The method of claim 1, wherein encrypting the first data part comprises encrypting the first data part in a trusted execution environment (TEE).

4. The method of claim 1, further comprising:
receiving a read request for reading the first data;
reading the encrypted first data part from the non-volatile memory;
reading the second data part from the hard disk or the magnetic disk;
decrypting the encrypted first data part to obtain the first data part; and
obtaining the first data based on the first data part and the second data part.

5. The method of claim 1, further comprising migrating the first data part from the non-volatile memory to the hard disk or the magnetic disk when the first data part meets a migration condition.

6. The method of claim 5, wherein the migration condition comprises at least one of a time required for encrypting and decrypting the first data part exceeding a first threshold or a frequency of accessing the first data part being less than a second threshold.

7. The method of claim 5, wherein the migration condition comprises a capacity of the non-volatile memory reaching a limit.

8. The method of claim 1, further comprising:
indexing the encrypted first data part in the non-volatile memory using a first index structure; and
indexing the second data part in the hard disk or the magnetic disk using a second index structure, wherein the second index structure is different than the first index structure.

9. A computing device comprising:
a memory configured to store computer program instructions; and
a processor coupled to the memory and configured to execute the computer program instructions to cause the computing device to:
receive first data;
encrypt a first data part of the first data to obtain an encrypted first data part;
write the encrypted first data part into a non-volatile memory;
write a second data part of the first data into one of a hard disk or a magnetic disk; and
write first metadata of the first data part and second metadata of the second data part into the non-volatile memory, wherein the first metadata comprises a duration required for encrypting and decrypting the first data part and a quantity of times of accessing the first data part.

10. The computing device of claim 9, wherein the processor executes the computer program instructions to further cause the computing device to encrypt the first data part in the first data in a trusted execution environment (TEE).

11. The computing device of claim 9, wherein the processor executes the computer program instructions to further cause the computing device to migrate the first data part from the non-volatile memory to the hard disk or the magnetic disk when the first data part meets a migration condition.

12. The computing device of claim 11, wherein the migration condition comprises at least one of a time required for encrypting and decrypting the first data part exceeding a first threshold or a frequency of accessing the first data part being less than a second threshold.

13. The computing device of claim 9, wherein the processor executes the computer program instructions to further cause the computing device to:
receive a read request for reading the first data;
read the encrypted first data part from the non-volatile memory;
read the second data part from the hard disk or the magnetic disk;
decrypt the encrypted first data part to obtain the first data part; and
obtain the first data based on the first data part and the second data part.

14. The computing device of claim 9, wherein the processor executes the computer program instructions to further cause the computing device to:

index the encrypted first data part in the non-volatile memory using a first index structure; and index the second data part in the hard disk or the magnetic disk using a second index structure, wherein the second index structure is different than the first index structure.

15. A computer program product comprising computer-executable instructions stored on a non-transitory computer-readable storage medium, wherein when executed by a processor of a computing device, the computer-executable instructions cause the computing device to:

receive first data;

encrypt a first data part of the first data to obtain an encrypted first data part;

write the encrypted first data part into a non-volatile memory;

write a second data part of the first data into one of a hard disk or a magnetic disk; and write first metadata of the first data part and second metadata of the second data part into the non-volatile memory, wherein the first metadata comprises a duration required for encrypting and decrypting the first data part and a quantity of times of accessing the first data part.

16. The computer program product of claim 15, wherein the processor is configured to further execute the computer-executable instructions to cause the computing device to encrypt the first data part in a trusted execution environment (TEE).

17. The computer program product of claim 15, wherein the processor is configured to further execute the computer-executable instructions to cause the computing device to migrate the first data part from the non-volatile memory to the hard disk or the magnetic disk when the first data part meets a migration condition.

18. The computer program product of claim 17, wherein the migration condition comprises at least one of a time required for encrypting and decrypting the first data part exceeding a first threshold or a frequency of accessing the first data part being less than a second threshold.

19. The computer program product of claim 15, wherein the processor is configured to further execute the computer-executable instructions to cause the computing device to:

receive a read request, wherein the read request is for reading the first data;

read the encrypted first data part from the non-volatile memory;

read the second data part from the hard disk or the magnetic disk;

decrypt the encrypted first data part to obtain the first data part; and obtain the first data based on the first data part and the second data part.

20. The computer program product of claim 15, wherein the processor is configured to further execute the computer-executable instructions to cause the computing device to:

index the encrypted first data part in the non-volatile memory using a first index structure; and index the second data part in the hard disk or the magnetic disk using a second index structure, wherein the second index structure is different than the first index structure.

\* \* \* \* \*